United States Patent
Takahashi et al.

(10) Patent No.: US 10,029,593 B2
(45) Date of Patent: Jul. 24, 2018

(54) VEHICLE SEAT

(71) Applicant: TOYOTA JIDOSHA KABUSHIKI KAISHA, Toyota-shi (JP)

(72) Inventors: Gen Takahashi, Nagakute (JP); Hiroki Hori, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 57 days.

(21) Appl. No.: 14/969,575

(22) Filed: Dec. 15, 2015

(65) Prior Publication Data

US 2016/0176328 A1    Jun. 23, 2016

(30) Foreign Application Priority Data

Dec. 19, 2014    (JP) .................... 2014-257458

(51) Int. Cl.
*B60N 2/58*    (2006.01)
*B60N 2/64*    (2006.01)
(Continued)

(52) U.S. Cl.
CPC ............... *B60N 2/70* (2013.01); *B60N 2/58* (2013.01); *B60N 2/5816* (2013.01);
(Continued)

(58) Field of Classification Search
CPC .... B60N 2/4235; B60N 2/449; B60N 2/4492; B60N 2/58; B60N 2/5816; B60N 2/5883;
(Continued)

(56) References Cited

U.S. PATENT DOCUMENTS 7,942,477 B1 *  5/2011  Toba ............... B60N 2/002
                                          297/180.12
9,550,440 B2 *  1/2017  Nagayasu ........... B60N 2/7094
(Continued)

FOREIGN PATENT DOCUMENTS

EP    1 757 206 A1    2/2007
EP    2 177 475 A1    4/2010
(Continued)

OTHER PUBLICATIONS

Office Action dated Nov. 22, 2016 in Japanese Patent Application No. 2014-257458 (with English language translation).
(Continued)

*Primary Examiner* — Ryan D Kwiecinski
(74) *Attorney, Agent, or Firm* — Oblon, McClelland, Maier & Neustadt, L.L.P.

(57) ABSTRACT

A vehicle seat includes: a cushion that has a main portion that configures part of the seat cushion or the seat back and is placed in the seat width direction middle portion of the cushion and a pair of right and left side support portions that project toward the seat upper side or the seat front side relative to the main portion; and a cover that has side support portion cover portions and a main portion cover portion, with both seat width direction end portions of the main portion cover portion being joined to the side support portion cover portions, and with the seat width direction dimension of the main portion cover portion being longer than the seat width direction dimension of a surface on the seated occupant side of the main portion in a deformed state resulting from an occupant being seated.

6 Claims, 4 Drawing Sheets

(51) Int. Cl.
  *B60N 2/70* (2006.01)
  *B60N 2/90* (2018.01)
  *B60N 2/68* (2006.01)
  *B60N 2/02* (2006.01)

(52) U.S. Cl.
  CPC ........... *B60N 2/5883* (2013.01); *B60N 2/646* (2013.01); *B60N 2/68* (2013.01); *B60N 2/986* (2018.02); *B60N 2/99* (2018.02); *B60N 2002/0288* (2013.01); *B60N 2205/30* (2013.01); *B60N 2205/35* (2013.01)

(58) Field of Classification Search
  CPC .. B60N 2/646; B60N 2/68; B60N 2002/0288; B60N 2205/30; B60N 2205/35
  See application file for complete search history.

(56) References Cited

U.S. PATENT DOCUMENTS

| | | | | |
|---|---|---|---|---|
| 2013/0049424 | A1* | 2/2013 | Funaki | B60N 2/4228 297/354.1 |
| 2013/0270887 | A1* | 10/2013 | Matsumoto | B60N 2/4228 297/452.34 |
| 2014/0225407 | A1* | 8/2014 | Nagayasu | B60N 2/14 297/344.1 |
| 2016/0137108 | A1* | 5/2016 | Takahashi | B60N 2/72 297/452.35 |
| 2016/0152203 | A1* | 6/2016 | Wiegelmann | B60R 21/207 280/730.2 |

FOREIGN PATENT DOCUMENTS

| | | | | |
|---|---|---|---|---|
| EP | 2 711 250 A1 | 3/2014 | | |
| JP | 59-70548 U | 5/1984 | | |
| JP | 1-63441 U | 4/1989 | | |
| JP | 2012-254719 | 12/2012 | | |
| JP | 2013-176417 A | 9/2013 | | |
| JP | 2014-19319 A | 2/2014 | | |
| JP | 2014-144660 | 8/2014 | | |
| JP | 2016190622 A | * | 11/2016 | ............. A47C 31/02 |
| WO | WO-2016158042 A1 | * | 10/2016 | ............. A47C 31/02 |

OTHER PUBLICATIONS

Extended Search Report dated May 18, 2016 in European Patent Application No. 15200310.9.
Combined Chinese Office Action and Search Report dated Sep. 11, 2017 in Chinese Patent Application No. 201510937545.X (with English translation of the Office Action and English translation of Category of Cited Documents).

* cited by examiner

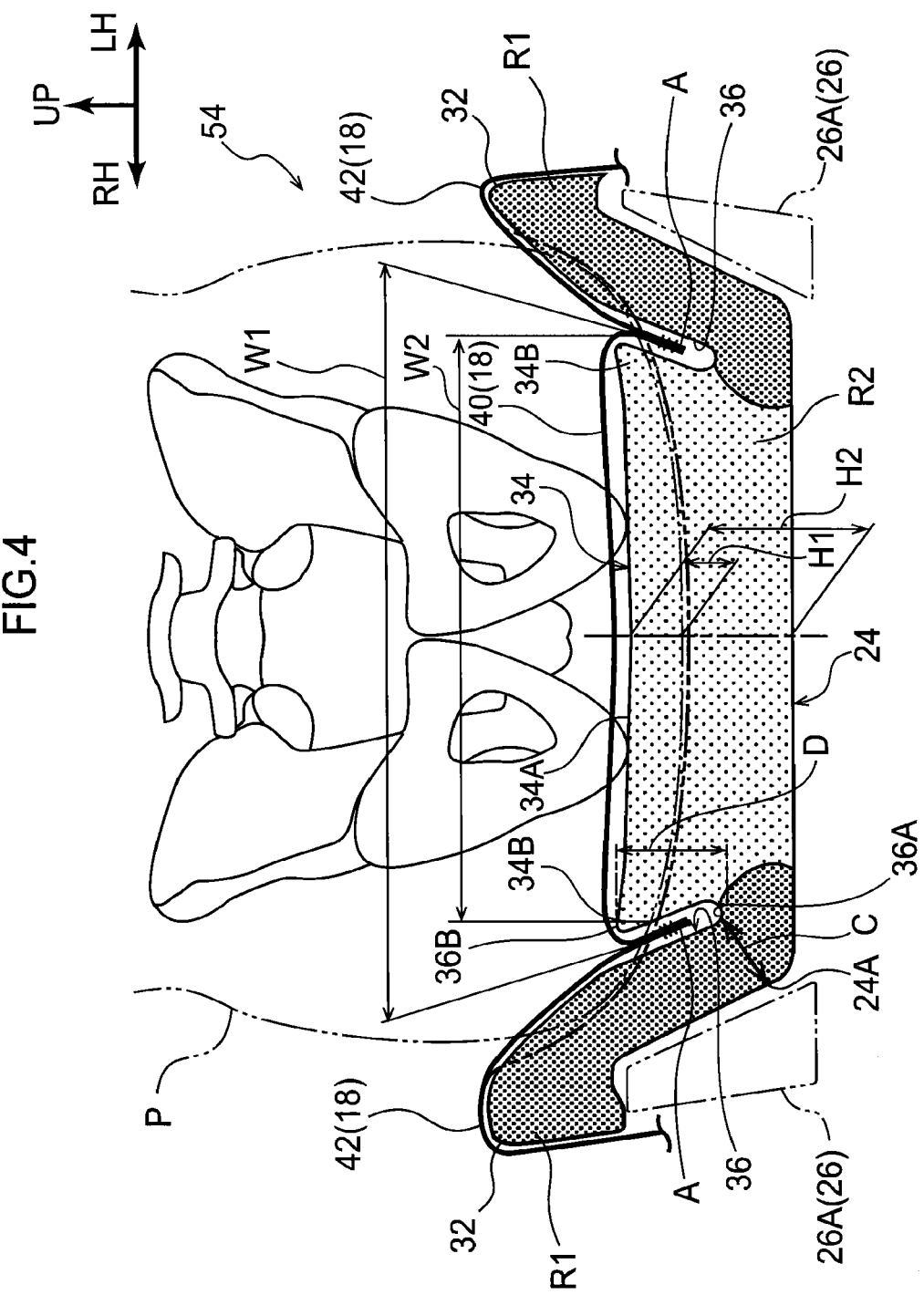

VEHICLE SEAT

CROSS-REFERENCE TO RELATED APPLICATION

This application is based on and claims priority under 35 USC 119 from Japanese Patent Application No. 2014-257458 filed on Dec. 19, 2014, the disclosure of which is incorporated by reference herein.

BACKGROUND

Technical Field

The present invention relates to a vehicle seat.

Related Art

Japanese Patent Application Laid-open (JP-A) No. 2012-254719 discloses a vehicle seat with an improved ability to hold, in the seat width direction, a seated occupant when a lateral acceleration occurs. A seat cushion that configures part of the vehicle seat is equipped with a seat cushion pad (a seat pad), which is formed in such a way that both of its seat width direction side portions project toward the seat upper side from its seat width direction center section, and a cover (a seat cover), which covers the seat cushion pad. Additionally, bags containing a dilatant fluid are disposed between the cover and the surface on the occupant side of both side portions of the seat cushion pad, and thus the ability to hold, in the seat width direction, the occupant seated on the seat cushion is improved.

Furthermore, JP-A No. 2014-144660 discloses a seat back for a vehicle seat that is made capable of being fitted to the body shape of a seated occupant. The seat back is equipped with a support member that is attached to a seat back frame, a seat back pad that is attached to the support member, and a cover that covers the seat back pad. Additionally, by setting the stiffness of the region of the support member corresponding to the spinal column of the seated occupant higher than the stiffness of other sections, the support member conforms to the body shape of the seated occupant.

However, in the vehicle seats described above, when the cover is pulled when the occupant is seated on the vehicle seat, it is conceivable that the cover will become like a hammock with support points at both seat width direction end portions of the seat cushion pad or the seat back pad. Because of this, it is conceivable that the body of the seated occupant will rock in the seat width direction when a lateral acceleration occurs.

SUMMARY OF THE INVENTION

In consideration of the circumstance described above, it is an object of the present invention to obtain a vehicle seat whose ability to hold, in the seat width direction, a seated occupant when a lateral acceleration occurs can be ensured.

A vehicle seat pertaining to a first aspect of the present invention includes: a frame member that forms a frame of a seat cushion that supports the buttocks and thighs of a seated occupant or of a seat back that supports the upper body of a seated occupant; a cushion that is attached to the frame member and that has a main portion that configures part of the seat cushion or configures part of the seat back and that is placed in a seat width direction middle portion of the cushion, and a pair of right and left side support portions that are placed on respective seat width direction side portions of the main portion, that project toward a seat upper side relative to the main portion in a case which the main portion configures part of the seat cushion, and that project toward a seat front side relative to the main portion in a case in which the main portion configures part of the seat back; and a cover that has side support portion cover portions that cover the pair of right and left side support portions, and a main portion cover portion that covers the main portion, with both seat width direction end portions of the main portion cover portion being joined to the side support portion cover portions, and with a seat width direction dimension of the main portion cover portion being longer than a seat width direction dimension of a surface on a seated occupant side of the main portion in a deformed state resulting from an occupant having a body shape and a body weight of a standard build being seated.

According to the vehicle seat pertaining to the first aspect, when an occupant sits on the seat cushion and leans back against the seat back, the load of the occupant is transmitted via the cushion covered by the cover to the frame member. Because of this, the buttocks, thighs, and upper body of the seated occupant are supported.

Here, in the present invention, the cover that covers the cushion is configured to have the side support portion cover portions and the main portion cover portion. Additionally, the seat width direction dimension of the main portion cover portion is set longer than the seat width direction dimension of the surface on the seated occupant side of the main portion in a deformed state resulting from a predetermined occupant being seated. For this reason, the main portion cover portion (the seat width direction middle portion) of the cover is kept from adopting a shape like that of a hammock with support points at the side support portion cover portions of the cover. That is, the load of the seated occupant is kept from being supported more by the cover that bridges the pair of side support portions than the main portion that is the cushion. Because of this, the body of the seated occupant can be kept from rocking in the seat width direction when a lateral acceleration occurs. That is, according to the vehicle seat of the present invention, the ability to hold the seated occupant in the seat width direction when a lateral acceleration occurs can be ensured.

A vehicle seat pertaining to a second aspect of the present invention is the vehicle seat pertaining to the first aspect, wherein channel grooves, in which joint portions between the main portion cover portion and the side support portion cover portions are placed, are formed in the cushion in boundary portions between the main portion and the side support portions, and an amount of deformation in a thickness direction of the main portion that becomes deformed as a result of an occupant having a body shape and a body weight of a standard build being seated is shorter than a distance from groove bottoms to open ends of the channel grooves.

In this connection, in a configuration where the channel grooves are formed in the cushion in the boundary portions between the main portion and the side support portions, when the occupant applies pressure to the main portion, both seat width direction end portions of the main portion move into the channel grooves (the main portion of the cushion becomes deformed in such a way as to narrow the channel grooves). For that reason, in the regions of the main portion from the groove bottoms to the open ends of the channel grooves, the main portion easily becomes deformed in its thickness direction. Therefore, in the vehicle seat pertaining to the second aspect, the amount of deformation in the thickness direction of the main portion that becomes deformed as a result of a predetermined occupant being seated is set shorter than the distance from the groove bottoms to the open ends of the channel grooves. Because of this, the occupant can be kept from feeling the hardness of the main portion. That is, according to the vehicle seat of the present invention, the cushioning feel of the seat cushion or the seat back can be kept from being impaired.

A vehicle seat pertaining to a third aspect of the present invention is the vehicle seat pertaining to the second aspect, wherein the groove bottoms of the channel grooves are positioned at a seat width direction inner side of the open ends of the channel grooves as seen in a seat front view or as seen in a seat plan view.

According to the vehicle seat pertaining to the third aspect, by placing the positions of the groove bottom ends of the channel grooves on the seat width direction inside of the positions of the open ends of the channel grooves, the distance between the groove bottoms of the channel grooves and the outer surface of the cushion can be kept from becoming shorter. Because of this, when causing a material to foam inner side a mold to mold the cushion, the flow of the foamed material can be kept from being hindered. That is, according to the present invention, the moldability of the cushion can be kept from being impaired.

A vehicle seat pertaining to a fourth aspect of the present invention is the vehicle seat pertaining to the second aspect or the third aspect, wherein at least parts of the channel grooves are sloped outward in the seat width direction heading from a groove bottom side to an open end side of the channel grooves, and the hardness of regions of the cushion on a seat width direction outer sides of the channel grooves is higher than the hardness of a region of the cushion on a seat width direction inner side of the channel grooves.

According to the vehicle seat pertaining to the fourth aspect, at least parts of the channel grooves are sloped, so the sections of the cushion that are high in hardness can be made to conform to the shape of the buttocks or the upper body of the seated occupant. Because of this, in the present invention, the ability to hold, in the seat width direction, the seated occupant when a lateral acceleration occurs can be improved.

A vehicle seat pertaining to a fifth aspect of the present invention is the vehicle seat of any one of the first aspect to the fourth aspect, wherein the frame member is a seat cushion frame that configures the frame of the seat cushion, and the cushion is a seat cushion pad that has the main portion, whose thickness direction coincides with a seat vertical direction and which extends in the seat width direction, and the pair of right and left side support portions, which project toward the seat upper side relative to the main portion.

According to the vehicle seat pertaining to the fifth aspect, by setting in the way described above the seat width direction dimension of the main portion cover portion of the cover of the seat cushion to which most of the body weight of the occupant is applied, the ability to hold, in the seat width direction, the seated occupant when a lateral acceleration occurs can be ensured.

A vehicle seat pertaining to a sixth aspect of the present invention includes: a frame member that forms a frame of a seat cushion that supports the buttocks and thighs of a seated occupant or of a seat back that supports the upper body of a seated occupant; a cushion that is attached to the frame member and that has a main portion that configures part of the seat cushion or configures part of the seat back and that is placed in a seat width direction middle portion of the cushion, a pair of right and left side support portions that are placed on respective seat width direction side portions of the main portion, and that project toward a seat upper side or toward a seat front side relative to the main portion, and channel grooves that are formed in boundary portions between the main portion and the side support portions and whose seated occupant sides are open; and a cover that has side support portion cover portions that cover the pair of right and left side support portions, and a main portion cover portion that covers the main portion, with both seat width direction end portions of the main portion cover portion being joined to the side support portion cover portions, wherein joint portions between the side support portion cover portions and the main portion cover portion are placed on groove bottom sides of depth direction middle portions of the channel grooves.

According to the vehicle seat pertaining to the sixth aspect, the joint portions between the side support portion cover portions and the main portion cover portion are placed on the groove bottom sides of the depth direction middle portions of the channel grooves formed in the cushion. Because of this, when an occupant sits on the seat cushion and leans back against the seat back, the main portion cover portion of the cover is kept from being pulled and the cover is kept from becoming like a hammock-like with support points at the side support portions of the cushion. Because of this, the body of the seated occupant can be kept from rocking in the seat width direction when a lateral acceleration occurs. That is, according to the vehicle seat of the present invention, the ability to hold, in the seat width direction, the seated occupant when a lateral acceleration occurs can be ensured.

A vehicle seat pertaining to a seventh aspect of the present invention is the vehicle seat pertaining to the sixth aspect, wherein the depth of the channel grooves is equal to or greater than 25% of the thickness of a seat width direction middle portion of the main portion.

In this connection, in a configuration where the channel grooves are formed in the cushion in the boundary portions between the main portion and the side support portions, when the occupant applies pressure to the main portion, both seat width direction end portions of the main portion move into the channel grooves (the main portion of the cushion becomes deformed in such a way as to narrow the channel grooves). For that reason, in the regions of the main portion from the open ends to the groove bottoms of the channel grooves, the main portion easily becomes deformed in its thickness direction. Therefore, in the vehicle seat pertaining to the seventh aspect, the depth of the channel grooves is set equal to or greater than 25% of the thickness of the seat width direction middle portion of the main portion. Because of this, when an occupant having a standard body shape and body weight sits on the seat cushion and leans back against the seat back, the main portion can be allowed to become deformed in the regions from the open ends to the groove bottom ends of the channel grooves. Because of this, the occupant can be kept from feeling the hardness of the main portion. That is, according to the vehicle seat of the present invention, the cushioning feel of the seat cushion or the seat back that the seated occupant experiences can be kept from being impaired.

The vehicle seat pertaining to the present invention has the superior effect that its ability to hold, in the seat width direction, the seated occupant when a lateral acceleration occurs can be ensured.

BRIEF DESCRIPTION OF THE DRAWINGS

An embodiment of the present invention will be described in detail based on the following figures, wherein:

FIG. 4 is a plan sectional view corresponding to FIG. 1 showing a seat cushion pertaining to a second example modification.

DETAILED DESCRIPTION OF THE INVENTION

Figure 1:
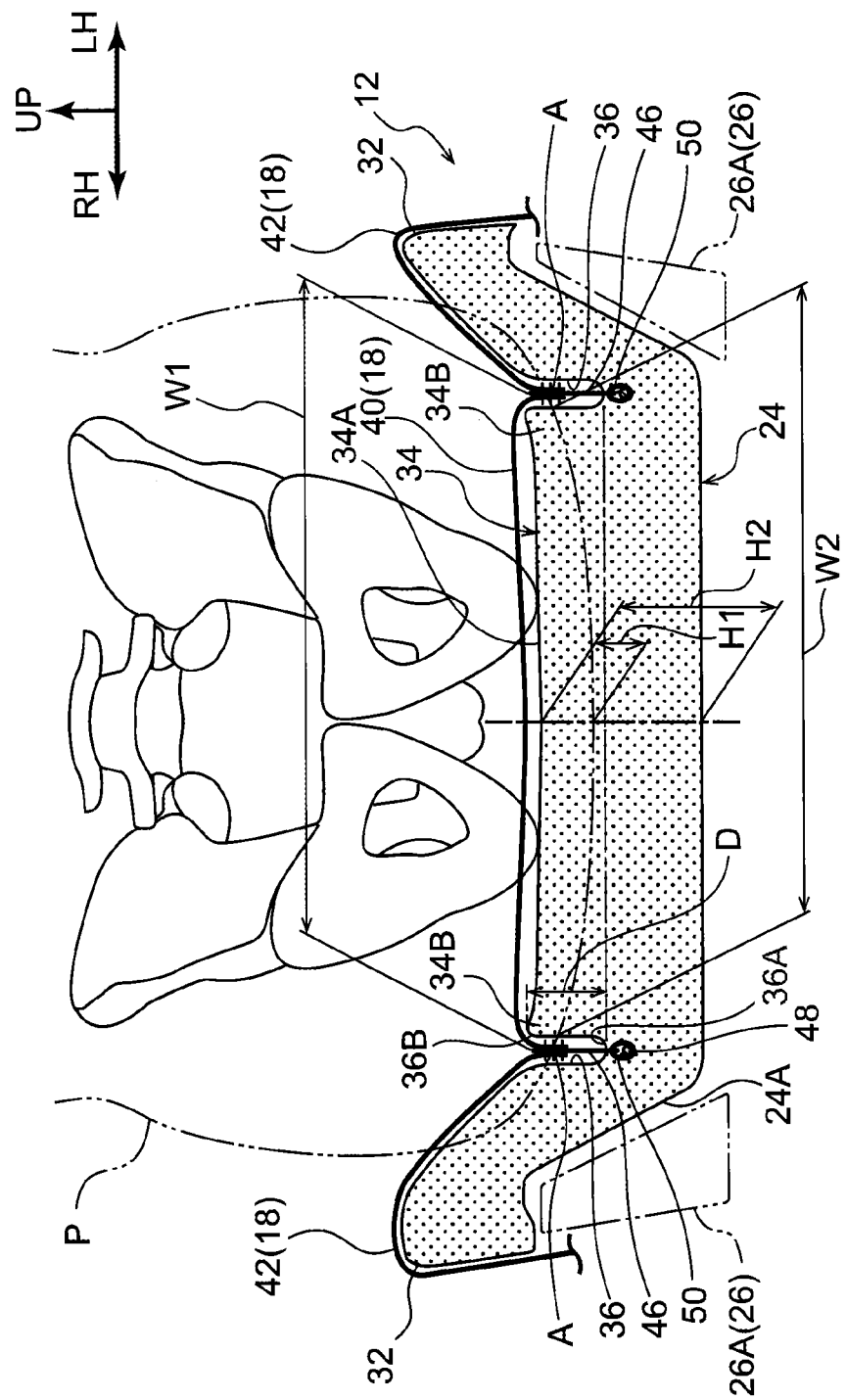
FIG. 1 is a plan sectional view showing a cross section of a seat cushion cut along line 1-1 shown in FIG. 2.

A vehicle seat 10 pertaining to an embodiment of the present invention will be described using FIG. 1 and FIG. 2. When description is given below using the directions of front, rear, right, left, up, and down, these will be understood to mean the directions of front, rear, right, left, up, and down as seen from the perspective of an occupant seated on the vehicle seat 10. Furthermore, arrow FR appropriately shown in the drawings indicates a forward direction, arrow UP indicates an upward direction, arrow RH indicates a rightward direction, and arrow LH indicates a leftward direction. Furthermore, arrow RH and arrow LH correspond to the seat width direction.

Figure 2:
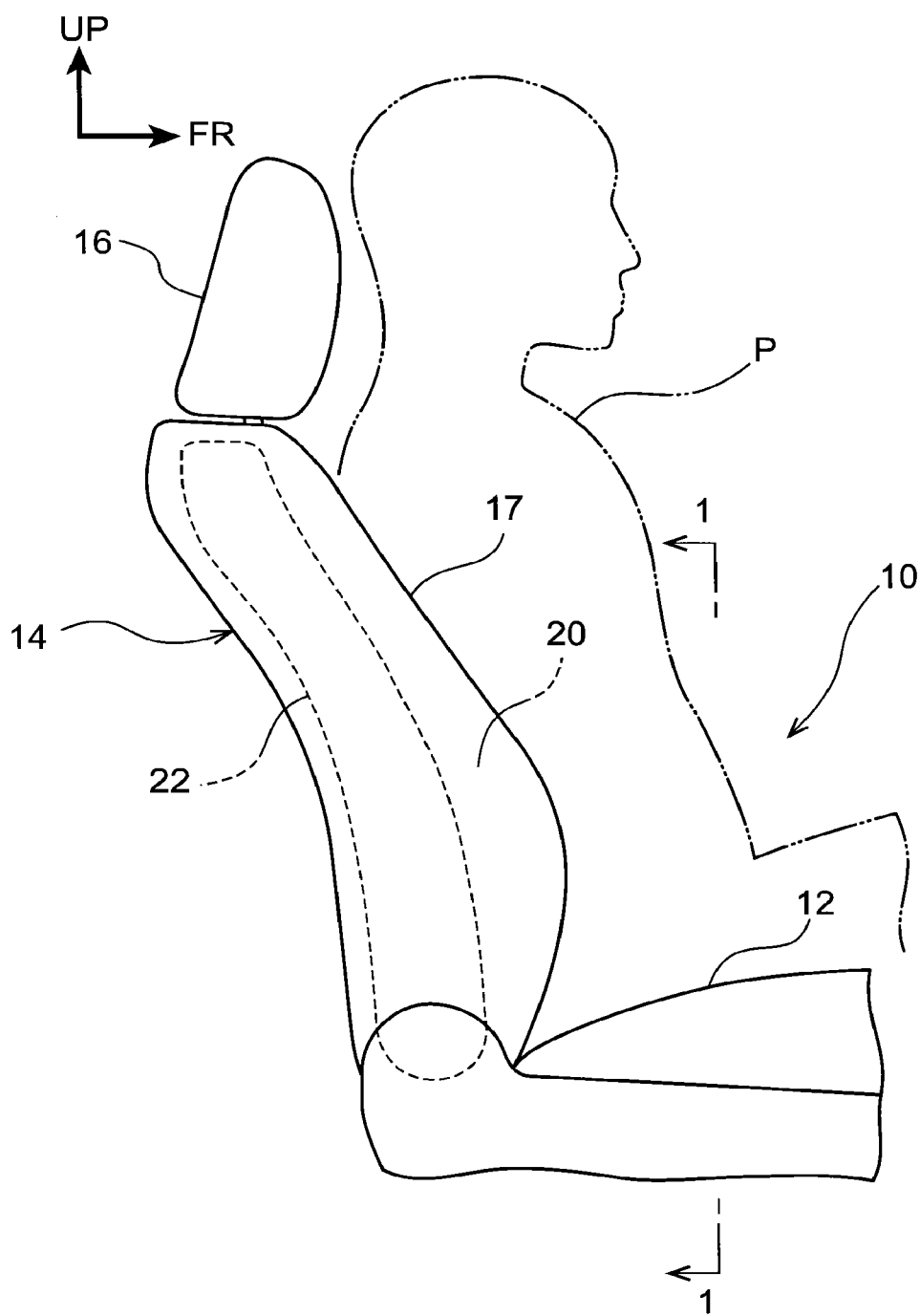
FIG. 2 is a side view showing a vehicle seat and an occupant seated on the vehicle seat.

As shown in FIG. 2, the vehicle seat 10 of the present embodiment is used as a driver seat or a front passenger seat. The vehicle seat 10 is equipped with a seat cushion 12 that supports the buttocks and thighs of an occupant P, a seat back 14 that supports the back of the occupant P, and a head rest 16 that supports the head of the occupant P. The seated occupant P shown in FIG. 1 and FIG. 2 has the same body shape and the same body weight as those of a SAE J864 mannequin, which is a standard build. The seated occupant P is seated in a standard posture on the vehicle seat 10, which is set to a standard use state.

The seat back 14 is attached to the rear end portion of the seat cushion 12 in such a way that the seat back 14 can be tilted. The seat back 14 is configured as a result of a seat back pad 20 serving as a cushion covered by a cover 17 being attached to a seat back frame 22.

As shown in FIG. 1, the seat cushion 12 is configured as a result of a seat cushion pad 24 serving as a cushion covered by a cover 18 being attached to a seat cushion frame 26.

The seat cushion frame 26, which serves as a frame member that configures a frame of the seat cushion 12, is equipped with a pair of side frames 26A disposed extending in the seat front and rear direction in the seat width direction right side and left side end portions inside the seat cushion 12. Furthermore, a non-illustrated seat cushion spring bridges the right and left side frames 26A.

The seat cushion pad 24 is formed by injecting a foam resin material such as polyurethane resin inside a mold and causing the foam resin material to foam inside the mold. The seat cushion pad 24 is equipped with a pair of right and left side support portions 32, which are placed on both seat width direction end portions of the seat cushion pad 24, and a main portion 34, which is placed between the pair of right and left side support portions 32. The side support portions 32 are formed projecting toward the seat upper side relative to the seat main portion 34 to thereby keep the occupant P seated on the vehicle seat 10 from moving in the seat width direction.

Furthermore, channel grooves 36 whose seat upper sides (seated occupant P sides) are open are formed in the seat cushion pad 24 in the boundaries between the side support portions 32 and the main portion 34.

The cover 18 that covers the seat cushion pad 24 described above is made of cloth or leather. The cover 18 of the present embodiment is formed as a result of a main portion cover portion 40, which covers a surface 34A on the seated occupant P side of the main portion 34, and side support portion cover portions 42, which cover surfaces on the seated occupant P side and surfaces on the seat width direction outsides of the side support portions 32, being appropriately sewn together.

Specifically, the seat width direction inside end portions of the side support portion cover portions 42 and the seat width direction outside end portions of the main portion cover portion 40 are sewn together. Furthermore, first ends of connecting members (cotton cloth straps) 46 are joined by sewing to sewn portions A (joint portions) between the seat width direction inside end portions of the side support portion cover portions 42 and the seat width direction outside end portions of the main portion cover portion 40. Second ends of the connecting members 46 are connected by hog rings 50 to insert wires 48 insert molded in the seat cushion pad 24 in groove bottom portions of the channel grooves 36.

Furthermore, in the present embodiment the sewn portions A between the side support portion cover portions 42 and the main portion cover portion 40 are placed in the depth direction (up and down direction) middle portions of the channel grooves 36. That is, the sewn portions A between the side support portion cover portions 42 and the main portion cover portion 40 are placed on the upper side of groove bottoms 36A of the channel grooves 36 and on the lower side of open ends 36B. Because of this, a seat width direction dimension W1 of the main portion cover portion 40 is longer than a seat width direction dimension W2 of the surface 34A on the seated occupant P side of the main portion 34 in a deformed state resulting from the seated occupant P with the same body shape and the same body weight as the SAE J864 mannequin being seated. The seat width direction dimension W1 of the main portion cover portion 40 is a vehicle width direction dimension in a state in which the main portion cover portion 40 has been linearly extended in the seat width direction in a state in which tension is not applied to the main portion cover portion 40. Furthermore, the seat width direction dimension W2 of the surface 34A on the seated occupant P side of the main portion 34 in a deformed state resulting from the seated occupant P being seated is a vehicle width direction dimension in a state in which the surface 34A on the seated occupant P side of the main portion 34 deformed in such a way as to curve due to pressure being applied thereto by the buttocks of the seated occupant P is linearly extended in the seat width direction.

Moreover, in the present embodiment, a maximum amount of deformation H1 in the thickness direction (up and down direction) of the main portion 34 in a deformed state resulting from the seated occupant P with the same body shape and the same body weight as the SAE J864 mannequin being seated is shorter than a distance D from the open ends 36B to the groove bottoms 36A of the channel grooves 36. Specifically, the depth D of the channel grooves 36 (the distance D from the open ends 36B to the groove bottoms 36A of the channel grooves 36) is set equal to or greater than 25% of a thickness H2 of the seat width direction middle portion of the main portion 34. "Groove bottoms 36A" mean the deepest portions of the channel grooves 36.

Action and Effects of Present Embodiment

Next, the action and effects of the present embodiment will be described.

As shown in FIG. 1 and FIG. 2, according to the vehicle seat 10 of the present embodiment, when the occupant P sits on the seat cushion 12 and leans back against the seat back 14, the load of the occupant P is transmitted via the seat cushion pad 24 covered by the cover 18 and the seat back pad 20 covered by the cover 17 to the seat cushion frame 26 and the seat back frame 22. Because of this, the buttocks, thighs, and upper body of the seated occupant P are supported.

Here, in the present embodiment, the sewn portions A between the side support portion cover portions 42 and the main portion cover portion 40 are placed in the depth direction (up and down direction) middle portions of the channel grooves 36. Additionally, the seat width direction dimension W1 of the main portion cover portion 40 is longer than the seat width direction dimension W2 of the surface 34A on the seated occupant P side of the main portion 34 in a deformed state resulting from the seated occupant P with the same body shape and the same body weight as the SAE J864 mannequin being seated. For that reason, the main portion cover portion 40 (the seat width direction middle portion) of the cover 18 is kept from adopting a shape like a hammock with support points at the side support portion cover portions 42 of the cover 18. That is, the load of the seated occupant P is kept from being supported more by the cover 18 that bridges the pair of side support portions 32 than the main portion 34 of the seat cushion 12. Because of this, the body of the seated occupant P can be kept from rocking in the seat width direction when a lateral acceleration occurs. That is, according to the vehicle seat 10 of the present embodiment, the ability to hold, in the seat width direction, the seated occupant P when a lateral acceleration occurs can be ensured.

In this connection, in a configuration where the channel grooves 36 are formed in the seat cushion pad 24 in the boundary portions between the main portion 34 and the side support portions 32, when the occupant P applies pressure to the main portion 34, both seat width direction end portions 34B of the main portion 34 move into the channel grooves 36 (the main portion 34 of the seat cushion pad 24 becomes deformed in such a way as to narrow the channel grooves 36). For that reason, in the regions of the main portion 34 from the open ends 36B to the groove bottoms 36A of the channel grooves 36, the main portion 34 easily becomes deformed in its thickness direction. Therefore, in the present embodiment, the depth D of the channel grooves 36 is set equal to or greater than 25% of the thickness H2 of the seat width direction middle portion of the main portion 34. Because of this, the maximum amount of deformation H1 in the thickness direction (up and down direction) of the main portion 34 in a deformed state resulting from the seated occupant P with the same body shape and the same body weight as the SAE J864 mannequin being seated is shorter than the depth D of the channel grooves 36. As a result, the occupant P can be kept from feeling the hardness of the main portion 34. That is, according to the vehicle seat 10 of the present embodiment, the cushioning feel of the seat cushion 12 can be kept from being impaired.

In the present embodiment, an example is described where, by placing, in the depth direction (up and down direction) middle portions of the channel grooves 36, the sewn portions A between the side support portion cover portions 42 and the main portion cover portion 40, the seat width direction dimension W1 of the main portion cover portion 40 is set longer than the seat width direction dimension W2 of the surface 34A on the seated occupant P side of the main portion 34 in a deformed state resulting from the seated occupant P with the same body shape and the same body weight as the SAE J864 mannequin being seated. However, the present invention is not limited to this. For example, by placing, in the depth direction (front and rear direction) middle portions of channel grooves formed in the seat back pad 20, sewn portions between side support portion cover portions and a main portion cover portion of the cover 17 that covers the seat back pad 20, the seat width direction dimension of the main portion cover portion may be set longer than the seat width direction dimension of a surface on the seated occupant P side of the main portion in a deformed state resulting from the seated occupant P with the same body type and the same body weight as the SAE J864 mannequin leaning back against the seat back 14. That is, the present invention that has been applied to the seat cushion 12 can also be applied to the seat back 14.

Furthermore, in the present embodiment, an example is described where the depth D of the channel grooves 36 is set equal to or greater than 25% of the thickness H2 of the seat width direction middle portion of the main portion 34. However, the present invention is not limited to this. It suffices for the depth of the channel grooves 36 to be appropriately set in consideration of the cushioning feel and so forth required of the seat cushion 12.

(Seat Cushions Pertaining to First Example Modification and Second Example Modification)

Next, seat cushions pertaining to a first example modification and a second example modification of the embodiment will be described using FIG. 3 and FIG. 4. The same reference signs as those in the embodiment will be assigned to members and sections having the same functions as those in the embodiment, and description of those members and sections will be omitted.

Figure 3:
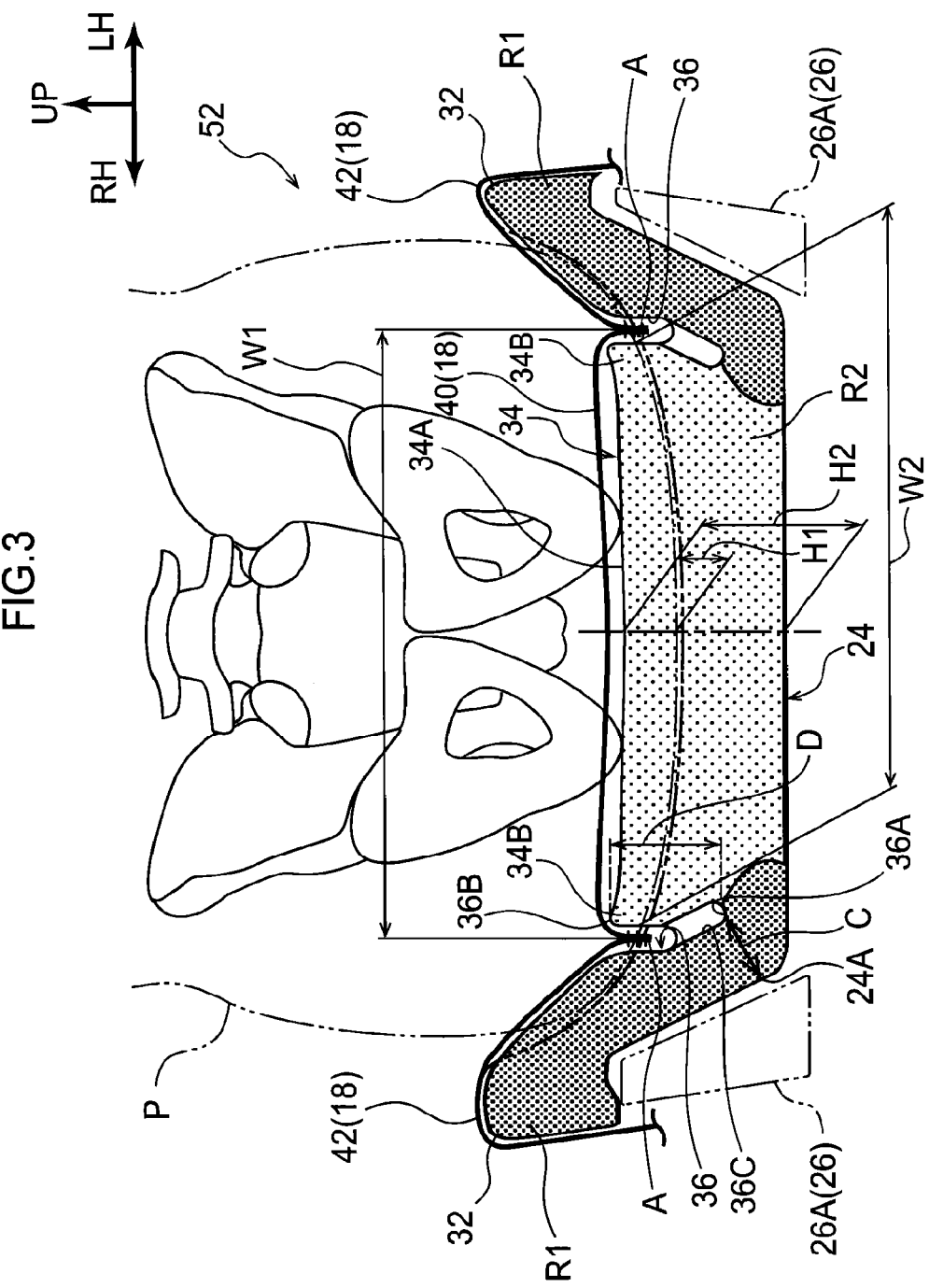
FIG. 3 is a plan sectional view corresponding to FIG. 1 showing a seat cushion pertaining to a first example modification.

As shown in FIG. 3, in a seat cushion 52 pertaining to the first example modification, the regions on the seat lower sides of the channel grooves 36 are configured as sloping portions 36C that are sloped outward in the seat width direction heading from the groove bottom 36A side to the open end 36B side of the channel grooves 36. Because of this, the groove bottoms 36A of the channel grooves 36 are positioned on the seat width direction inside of the open ends 36B of the channel grooves 36.

Furthermore, as shown in FIG. 4, in a seat cushion 54 pertaining to the second example modification, the entireties of the channel grooves 36 are sloped outward in the seat width direction heading from the groove bottom 36A side to the open end 36B side of the channel grooves 36. Because of this, the groove bottoms 36A of the channel grooves 36 are positioned on the seat width direction inside of the open ends 36B of the channel grooves 36.

In the seat cushions 52 and 54 pertaining to the first example modification and the second example modification described above, parts or the entireties of the channel grooves 36 are sloped as described above so that the groove bottoms 36A of the channel grooves 36 are positioned on the seat width direction inside of the open ends 36B of the channel grooves 36. Because of this, a distance C between the groove bottoms 36A of the channel grooves 36 and an outer surface 24A of the seat cushion pad 24 can be kept from becoming shorter. That is, in the mold for molding the seat cushion pad 24, the distance between the regions of the mold that form the groove bottoms 36A of the channel grooves 36 and the region of the mold that forms the outer surface 24A of the seat cushion pad 24 can be kept from becoming shorter.

In this connection, the seat cushion pad 24 that configures part of the seat cushions 52 and 54 is formed as a result of a material being foamed inside a mold configured in such a way that the end portions on the upper side of the side support portions 32 and the surface 34A on the seat upper side of the main portion 34 are positioned on the lower side of a manufacturing device. For that reason, when causing the material to foam inside the mold to mold the seat cushions 52 and 54, the flow of the foamed material can be kept from being hindered between the regions of the mold that form the groove bottoms 36A of the channel grooves 36 and the region of the mold that forms the outer surface 24A of the seat cushion pad 24. That is, in these example modifications, the moldability of the seat cushion pad 24 can be kept from being impaired.

Furthermore, in these example modifications, the bubble fractions of the sections that form the side support portions 32 and the section that forms the main portion 34 inside the mold are adjusted, so that in the seat cushion pad 24 the hardness of regions R1 on the seat width direction outsides of the channel grooves 36 is adjusted to be higher than the hardness of the region R2 on the seat width direction inside of the channel grooves 36. Because of this, the sections of the seat cushion pad 24 that are high in hardness can be made to conform to the shape of the buttocks of the seated occupant P. As a result, in these example modifications, the ability to hold, in the seat width direction, the seated occupant P when a lateral acceleration occurs can be improved.

An embodiment of the present invention has been described above, but naturally the present invention can be modified and implemented in a variety of ways in addition to what is described above without departing from the spirit thereof.

What is claimed is:

1. A vehicle seat, comprising:
   a frame member that forms a frame of a seat cushion that supports the buttocks and thighs of a seated occupant or of a seat back that supports the upper body of a seated occupant; and
   a cushion that is attached to the frame member and that has:
      a main portion that configures part of the seat cushion or configures part of the seat back and that is placed in a seat width direction middle portion of the cushion, and
      a pair of right and left side support portions that are placed on respective seat width direction side portions of the main portion, that project toward a seat upper side relative to the main portion in a case in which the main portion configures part of the seat cushion, and that project toward a seat front side relative to the main portion in a case in which the main portion configures part of the seat back; and
   a cover that has:
      side support portion cover portions that cover the pair of right and left side support portions, and
      a main portion cover portion that covers the main portion, with both seat width direction end portions of the main portion cover portion being joined to the side support portion cover portions, and with a seat width direction dimension of the main portion cover portion being longer than a seat width direction dimension of a surface on a seated occupant side of the main portion in a deformed state, the deformed state resulting from an occupant wherein
   channel grooves, in which joint portions between the main portion cover portion and the side support portion cover portions are placed, are formed in the cushion in boundary portions between the main portion and the side support portions;
   an amount of deformation in a thickness direction of the main portion, that becomes deformed as a result of the occupant being seated, is shorter than a distance from groove bottoms to open ends of the channel grooves;
   at least parts of the channel grooves are sloped outward in the seat width direction heading from a groove bottom side to an open end side of the channel grooves;
   a hardness of first regions of the cushion on seat width direction outer sides of the channel grooves is higher than a hardness of second regions of the cushion on a seat width direction inner side of the channel grooves; and
   a portion of the second regions is positioned above a portion of the first regions in a seat vertical direction where the first regions and the second regions contact each other extending from the groove bottoms of the channel grooves.

2. The vehicle seat according to claim 1, wherein the groove bottoms of the channel grooves are positioned at a seat width direction inner side of the open ends of the channel grooves as seen in a seat front view or as seen in a seat plan view.

3. The vehicle seat according to claim 1, wherein:
   the frame member is a seat cushion frame that forms the frame of the seat cushion; and
   the cushion is a seat cushion pad that has the main portion, whose thickness direction coincides with the seat vertical direction and which extends in the seat width direction, and the pair of right and left side support portions, which project toward the seat upper side relative to the main portion.

4. The vehicle seat according to claim 1, wherein a contact surface between the first regions and the second regions has an arch shape in profile.

5. A vehicle seat, comprising:
   a frame member that forms a frame of a seat cushion that supports the buttocks and thighs of a seated occupant or of a seat back that supports the upper body of a seated occupant;
   a cushion that is attached to the frame member and that has:
      a main portion that configures part of the seat cushion or configures part of the seat back and that is placed in a seat width direction middle portion of the cushion,
      a pair of right and left side support portions that are placed on respective seat width direction side portions of the main portion, and that project toward a seat upper side or toward a seat front side relative to the main portion, and
      channel grooves that are formed in boundary portions between the main portion and the side support portions; said channels having open ends at seated occupant side and channel groove bottoms; and whose seated occupant sides are open; and
   a cover that has:
      side support portion cover portions that cover the pair of right and left side support portions, and
      a main portion cover portion that covers the main portion, with both seat width direction end portions of the main portion cover portion being joined to the side support portion cover portions,
   wherein joint portions between the side support portion cover portions and the main portion cover portion are placed in the channel grooves at middle portions of the channel grooves in a depth direction, wherein an amount of deformation in a thickness direction of the main portion, that becomes deformed as a result of an occupant being seated, is shorter than a distance from the groove bottoms to the open ends of the channel grooves, wherein the channel groove bottoms of the channel grooves are positioned at a seat width direction inner side of the open ends of the channel grooves as seen in a seat front view or as seen in a seat plan view, wherein the channel grooves include a sloping portion that slopes outward in the seat width direction from the groove bottom to the open end, a hardness of first regions of the cushion on seat width direction outer sides of the channel grooves is higher than a hardness of second regions of the cushion on a seat width direction inner side of the channel grooves, and a portion of the second regions is positioned above a portion of the first regions in a seat vertical direction where the first regions and the second regions contact each other extending from the groove bottoms of the channel grooves.

6. The vehicle seat according to claim 5, wherein the depth of the channel grooves is equal to or greater than 25% of the thickness of a seat width direction middle portion of the main portion.

* * * * *